(12) United States Patent
Rugnone

(10) Patent No.: US 10,703,686 B2
(45) Date of Patent: Jul. 7, 2020

(54) PROCESS FOR THE PRODUCTION OF COMBINED FERTILIZERS

(71) Applicant: Casale SA, Lugano (CH)

(72) Inventor: Luca Rugnone, Como (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/575,878

(22) PCT Filed: Apr. 13, 2016

(86) PCT No.: PCT/EP2016/058054
§ 371 (c)(1),
(2) Date: Nov. 21, 2017

(87) PCT Pub. No.: WO2016/184615
PCT Pub. Date: Nov. 24, 2016

(65) Prior Publication Data
US 2018/0141879 A1    May 24, 2018

(30) Foreign Application Priority Data

May 21, 2015 (EP) ..................................... 15168758

(51) Int. Cl.
*C05G 3/00* (2020.01)
*C05G 5/12* (2020.01)
(Continued)

(52) U.S. Cl.
CPC ..................... *C05G 5/12* (2020.02);
*B01J 2/16* (2013.01); *C05C 3/005* (2013.01);
*C05C 9/005* (2013.01);
(Continued)

(58) Field of Classification Search
CPC .. C05G 3/0058; C05G 3/0088; C05G 3/0064;
C05G 3/0041; C05G 3/0035; B01J 2/16;
C05C 9/005; C05C 3/005
See application file for complete search history.

(56) References Cited

U.S. PATENT DOCUMENTS 6,159,252 A    12/2000 Schutte et al.
6,338,746 B1 *  1/2002 Detrick ................... C05C 9/005
                                                                71/28
(Continued)

FOREIGN PATENT DOCUMENTS

EP    1707258 A1   10/2006
EP    1935482 A1    6/2008
(Continued)

OTHER PUBLICATIONS

International Search Report dated Jul. 5, 2016 in connection with PCT/EP2016/058054.
(Continued)

*Primary Examiner* — Jennifer A Smith
(74) *Attorney, Agent, or Firm* — Akerman LLP

(57) ABSTRACT

A process for making a combined fertilizer comprising a first nitrogen-based fertilizer, such as urea or ammonium nitrate, and one or more further components chosen among: nitrogen-based fertilizers, being different from the first nitrogen-based fertilizer and nutrients, wherein the combined fertilizer is made by a process of granulation in a fluid bed, the fluid bed being preferably in a vortex condition.

19 Claims, 3 Drawing Sheets

(51) Int. Cl.
*C05C 3/00* (2006.01)
*C05G 3/20* (2020.01)
*C05G 5/20* (2020.01)
*C05G 5/30* (2020.01)
*B01J 2/16* (2006.01)
*C05C 9/00* (2006.01)

(52) U.S. Cl.
CPC ............... *C05G 3/20* (2020.02); *C05G 5/20* (2020.02); *C05G 5/30* (2020.02); *C05G 5/38* (2020.02)

(56) References Cited

U.S. PATENT DOCUMENTS

2003/0228981 A1\* 12/2003 Wertz .................. A01C 1/06
 504/100

2012/0017659 A1 1/2012 Pursell et al.

FOREIGN PATENT DOCUMENTS

| | | |
|---|---|---|
| EP | 2431346 A1 | 3/2012 |
| EP | 2489429 A1 | 8/2012 |
| SU | 827464 A1 | 5/1981 |
| WO | 02/074427 A2 | 9/2002 |
| WO | 2005/092486 A1 | 10/2005 |

OTHER PUBLICATIONS

International Preliminary Report on Patentability dated May 26, 2017 in connection with PCT/EP2016/058054.
Response to Written Opinion filed on May 2, 2017 in connection with PCT/EP2016/058054.

\* cited by examiner

PROCESS FOR THE PRODUCTION OF COMBINED FERTILIZERS

This application is a national phase of PCT/EP2016/058054, filed Apr. 13, 2016, and claims priority to EP 15168758.9, filed May 21, 2015, the entire contents of both of which are hereby incorporated by reference.

FIELD OF APPLICATION

The invention relates to the making of fertilizers. The invention relates more in detail to combined fertilizers. A combined fertilizer denotes a multi-component fertilizer including a first nitrogen-based fertilizer, such as urea or ammonium nitrate, and one or more further components chosen among: different nitrogen-based fertilizer and nutrients. Said nutrients may be for example sulphur, potassium, phosphorous or others.

PRIOR ART

Essential nutrients for plant growth are nitrogen (N), phosphorous (P) and potassium (K). Said elements are termed "macronutrients" since they are consumed in a large quantity, being deeply involved in the metabolic functions of the plant. Other nutrients required in a relatively large quantity such as calcium (Ca) and sulfur (S) are termed secondary macronutrients, while elements playing an important role but required in a small quantity, such as zinc (Zn), copper (Cu), manganese (Mn), chlorine (Cl), molybdenum (Mo), etc. are named "microelements".

In the recent years, intensive agriculture has called for improved fertilizers capable to maximize the yield. In addition, a vegetable species may require a specific mix of nutrients in terms of kind and/or quantity. Hence, there is an ongoing and strong interest in developing a highly flexible industrial process to produce fertilizers with a variable mix and/or concentration of nutrients. In addition, it is strongly demanded to provide combined fertilizers featuring a all-in-one formula instead of feeding different chemicals. A comprehensive formulation ensures that all necessary nutrients for a specific plant are administered uniformly and in the right proportion, while separately feeding the ground with different chemical products may lead to a non-uniform distribution of products and/or deviation from the ideal quantity of certain nutrients. Nitrogen is the most important element of a fertilizer. To date, the most common nitrogen sources for agricultural use are urea and ammonium nitrate. Urea or ammonium nitrate can be combined with different nutrients such as sulfur, potassium, phosphorus, calcium, etc. to make special formulations. Combined fertilizer may be produced and marketed in liquid form or, preferably, in solid form.

An example of liquid fertilizer is UAN (Urea Ammonium Nitrate), which includes two nitrogen sources without additional nutrients. UAN is produced in liquid form due to physical limitations of the solid mixture which tends to absorb the ambient humidity till the liquefaction.

Examples of solid combined fertilizers including one of the above nitrogen sources and additional nutrients are: UAS (Urea Ammonium Sulphate), ASN (Ammonium Sulphate Nitrate), CAN (Calcium Ammonium Nitrate) and NPK (nitrogen, phosphorous, potassium) which may be either urea or ammonium nitrate-based. They are usually marketed in a solid form of prills or granules and are produced through granulation processes.

A known process for making said combined fertilizers is granulation in a rotating drum which, however, has revealed a number of drawbacks. The granules have a poor quality in terms of size distribution and mechanical strength, due to high porosity. Furthermore, in the process for the preparation of a mixture to be finished as solid, the blending of different fertilizers often generates a two phase system where a solid separates as a slurry into the liquid phase. This is due to the non-complete solubility of a component in the mixture which often generates a not ideal system exhibiting an eutectic behaviour. Slurry systems are difficult to manage in a granulation or finishing process, leading to easy disengagement of the solid and liquid when the slurry is injected into the granulation system such as the rotating-drum granulator, which may negatively affect the quality of the product.

A known alternative process is the so-called pastillation where a slurry is dropped over a cooled steel belt to solidify in the shape of pastilles. However, pastillation units are quite large and expensive.

Another drawback of the above conventional techniques is that pastillation units, as well as rotating-drum granulators, are limited in terms of maximum capacity per single unit. For example, the maximum capacity of a pastillation unit is around 100-150 MTD (metric tons per day) while the current market requests call for large plants from 500 up to 2000 MTD capacity. Hence multiple units must be installed in parallel, increasing size and cost of the granulation or pastillation section.

A further drawback affecting both granulation and pastillation is the purely mechanical nature of the process. The required machines have complex moving parts such as the rotating drum and cooled belt respectively, which suffer problems of reliability.

SUMMARY OF THE INVENTION

The purpose of the invention is the provision of a process for the production of combined fertilizers in a granular form overcoming the above drawbacks of the prior art.

More specifically the invention aims at a process which is able to produce combined fertilizers of a desired formula, to meet the market demands of specific and high-performance fertilizers, and to deliver a good quality in terms of uniformity of the product and size distribution of the granules.

Further aims of the invention are to provide a process which can be implemented with a scalable, reliable and cost-effective equipment.

The above aims are reached with a process for making a combined fertilizer, according to the attached claims, comprising granulation in a fluid bed.

The term of combined fertilizer denotes a fertilizer comprising a first nitrogen-based fertilizer and one or more further components. Said further components are chosen among nitrogen-based fertilizers other than said first fertilizer, and nutrients. The nutrients can be for example sulphur, potassium, phosphorous or others.

Accordingly, an embodiment of the invention is a process for making a combined fertilizer comprising said first nitrogen-based fertilizer and a second nitrogen-based fertilizer. Another embodiment is a process for making a combined fertilizer comprising said first nitrogen-based fertilizer and one or more nutrients. Another embodiment is a process for making a combined fertilizer comprising said first nitrogen-based fertilizer and said second nitrogen-based fertilizer plus one or more nutrients.

For example the process of the invention can be applied to the making of UAS which is a combined fertilizer including one nitrogen source (urea) and ammonium sulphate as nutrient. The process of the invention can also be applied to the making of UAN which is a combined fertilizer including two nitrogen sources. According to the invention the UAN fertilizer, previously used only in liquid form due to its high hygroscopicity, can be produced in solid form of granules.

The applicant has found that a fluid-bed process is particularly appropriate for the making of such combined fertilizers. The advantages of the fluid-bed process include among others: no complex moving parts such as rotating drums or belts; scalability up to a large capacity per unit, greater capacity than those reached by known methods; good results in terms of uniform size and composition of the granules.

The fluid bed can be generated and maintained by feeding a granulation environment with a suitable amount of solid particles, to act as starting points of the granulation process, and with a liquid feed. A suitable flow of fluidization air, for example from bottom of the granulation environment, is also provided to keep the solid matter in the fluidized bed state.

Said solid particles are also termed seeds and can include one or more nitrogen-based fertilizers and/or one or more nutrients.

In a preferred embodiment, the liquid feed is obtained by dissolving said one or more further components in the first nitrogen-based fertilizer. In some embodiments, said liquid feed or a part of the liquid feed may also contain a solid phase of said one or more further components. For example in one embodiment the liquid feed or a part thereof has the form of a micronized slurry where the liquid phase is a solution of said one or more further components in the first fertilizer, and the solid phase is given by small crystals of said one or more further components.

The liquid feed (growth liquid) is fed preferably along the longitudinal direction of the bed, in order to progressively form the granules of the desired size. This addition of the liquid feed can be carried out in discrete points or continuously, according to different embodiments.

The above process is preferably carried out in a fluid bed under a so-called vortex condition. This term is used to denote that at least one vortex with a horizontal axis is established in the fluid bed. The horizontal vortex, more in detail, is substantially cylindrical and extends along a longitudinal direction of the fluid bed, from an inlet end to an outlet end of the bed. More preferably, the fluid-bed is a double-vortex condition including two substantially parallel and counter-rotating vortex with a horizontal axis. Inside the vortex, the granules have a rotary motion and a forward advance motion from inlet to outlet of the fluid bed, leading to a substantially helical motion.

An advantage of the vortex fluid-bed is the formation of a wetting zone and an evaporation zone. The granules transported by the vortex alternately travel through the wetting zone where they receive a thin layer of liquid, and through the evaporation zone where this layer solidifies making the granules to grow.

The vortex condition can be obtained with a suitable arrangement of the liquid feed. For example, in a substantially parallelepiped granulation environment, feeding the liquid slightly below the free surface of the bed, and in a direction perpendicular to the longitudinal axis of the bed, will generate a momentum leading to the formation of the above mentioned cylindrical vortex.

More preferably, the vortex regime of the fluid bed of the present invention is in accordance with EP 1 707 258, disclosing fluid-bed granulation in the finishing section of a urea plant.

Some preferred features of the invention are disclosed in the dependent claims.

In a preferred embodiment, a first liquid feed is provided to a first region of the granulation environment, and a second liquid feed is provided to a second and different region of said environment. The seeds are fed to said first section of the granulation environment, and said second region is downstream said first region.

The second liquid feed may have the same composition of the first liquid feed or a different composition. For example, in some embodiments the first liquid feed is a solution of said one or more further components in the first nitrogen-based fertilizer, with no solid phase (clear melt) while the second liquid feed contains a greater amount of said one or more further components, typically above the maximum solubility at the working temperature, leading to formation of a micronized slurry including crystals of the above one or more further components.

More preferably, in some embodiments, said clear melt is first generated by dissolving said one or more further components in the liquid fertilizer; a portion of said melt represents the first liquid feed, and a remaining portion is added with further amount of said one or more further components so as to form the second liquid feed as a micronized slurry.

Advantageously, in the first region of the granulation environment, the first liquid feed forms a layer around the solid seeds, obtaining first granules made of the seeds covered by said layer, and the micronized slurry is then sprayed over said granules travelling through the second region of the environment. The applicant has found that the layer formed in the first region acts as a binder layer facilitating the deposition of the micronized slurry in the subsequent steps of granulation.

Said binder layer is preferably a thin layer. The thickness of said binder layer is preferably not greater than the average size of the seeds. Preferably the thickness of said layer is between 1 and $1/10$ of average size of the seeds and more preferably between $1/2$ and $1/10$. Typically the seeds have an average size around 0.7 mm, e.g. 0.5 to 1.0 mm, and the thickness of the binder layer is less than 500 microns, preferably 200 to 400 microns.

The micronized slurry can be regarded as a solid matter dispersed in a liquid matrix and behaves substantially as a liquid phase. Said slurry is preferably sprayed in the form of droplets having an average size significantly greater than size of the solid particles of the slurry, preferably at least 5 times greater and more preferably at least 10 times greater. Preferably, the solid particles contained in the slurry have a size not greater than 100 microns and more preferably in the range 1 to 50 microns. An advantage of a small size of the solid particles and of the above ratbetween the size of particles and size of droplets of the slurry is that undesired separation of the solid matter from the liquid matrix in the sprayed flow, due to inertial effects, is kept to a minimum.

The average size of droplets is for example the diameter of substantially spherical droplets.

In some embodiments, one flow of liquid melt is used to generate both the first liquid feed and the second liquid feed. Said liquid melt can be obtained for example by dissolving said one or more further components in a liquid flow of said first nitrogen-based fertilizer.

More preferably, one embodiment of the invention provides the steps of:

dissolving said one or more further components in a liquid flow of the first nitrogen-based fertilizer, the ratbetween said one or more further components and the fertilizer being preferably below the eutectic point and the temperature after the adiabatic dissolution being controlled by preheating the components, so that no solid phase is present in the obtained liquid melt;

a first portion of said liquid melt forming the first liquid feed, and a second portion of said liquid melt being further added with said one or more further components in order to form the micronized slurry. Said second portion of the liquid melt is preferably larger than the first portion, for example the first portion is preferably 5% to 30% of the total flow and the second portion is preferably 70% to 95%.

The solid seeds can be generated with various techniques, such as crushing of a portion of the produced granules, or taking a portion of said liquid melt to generate the seeds, e.g. by pastillation. The above mentioned drawbacks of pastillation, in such a case, are less relevant since pastillation is only used to create small seeds (typically around 1 mm) instead of the larger granules (typically larger than 2 mm). In some embodiments, small crystals of said one or more further components can also be used as seeds.

The process of the invention may comprise the addition of suitable additives. Additives may be added to any liquid or solid feed or sprayed into the granulation environment. In some embodiments, one or more additives form a protective layer of the granules. Said protective layer has preferably a thickness of 50 to 300 micron, preferably of 100 to 200 micron. In some embodiments a hydrophobic additive is added to provide protection from humidity.

A preferred additive suitable to work as anticaking agent and mechanical strengthener comprises one or more of: blending of carbonates, sulphate or phosphate salts, metal oxides. Said additive can be optionally combined with an organic matter such as a wax formulation, an oil based solution or a cellulose based suspension.

For example, an aqueous solution containing 5 to 100 g/l of potassium phosphate can be added to the first liquid feed to achieve a concentration of 0.05 to 0.15% in the final product and a solid powder of calcium sulphate can be dispersed in the slurry phase to achieve a final concentration of 0.05 to 0.15% in the final product.

The invention may be applied to various combined fertilizers. A preferred application is the production of a combined fertilizer where:

said nitrogen-based fertilizers contain urea or ammonium nitrate or both in some formulations;

said nutrients comprise any of: sulphur, potassium, phosphorous, calcium and composite thereof, and possibly further comprise one or more microelements such as zinc, copper, manganese, chlorine, molybdenum.

The production of UAS and UAN are among the preferred applications of the invention. UAN is characterized by high tendency to absorb ambient humidity resulting in the formation of a liquid or a slurry of urea and ammonium nitrate. Absorption of humidity may also cause a depletion of the product quality in terms of mechanical properties, especially talking about crushing strength. Proper additive(s) can be added to a liquid feed or sprayed in the final stage to cover the granule with a "egg" shell protecting from humidity. Therefore, the process of the invention allows produce UAN in a solid form, which was previously produced only in a liquid form as already mentioned above.

An aspect of the invention is also a plant for carrying out any of the above described embodiments of the process.

These and other advantages will become clear from the detailed description below, with reference to the figures.

DESCRIPTION OF FIGURES

FIG. 5 is a more detailed scheme of another embodiment of the invention.

DETAILED DESCRIPTION

Figure 1:
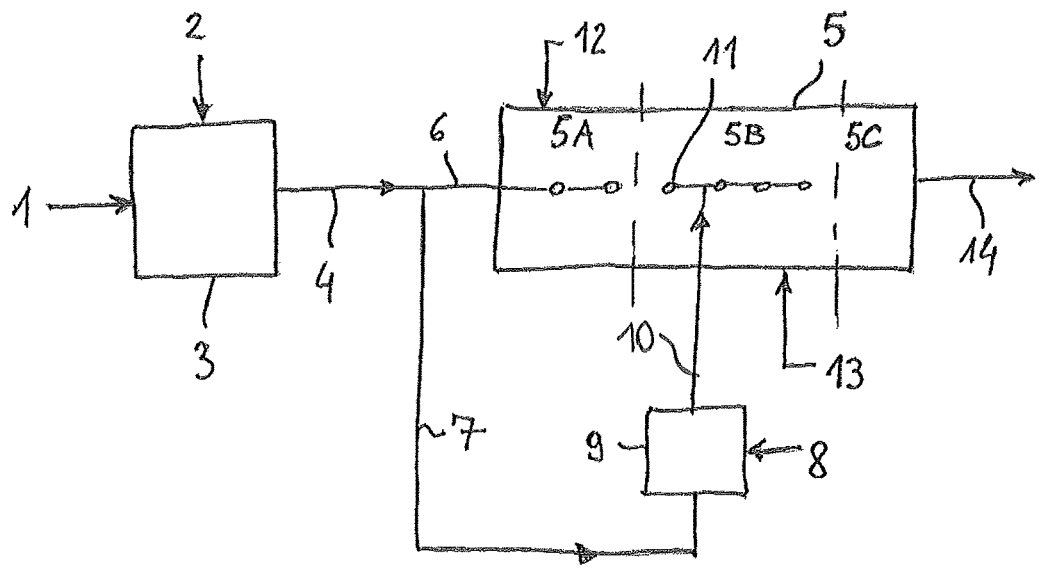
FIG. 1 is a scheme of the process for making UAS (Urea Ammonium Sulphate) according to an embodiment the invention.

FIG. 1 is a scheme of an embodiment of the invention where the at least one nitrogen-based fertilizer is urea and the at least one nutrient is ammonium sulphate (AS).

Reference 1 denotes a urea melt having high purity, preferably 95% or more. In some embodiments, for example when the urea melt 1 is delivered by a two-stage evaporation unit, the purity may be greater than 99%, for example 99.7%.

Stream 2 contains solid ammonium sulphate which is dissolved in the urea melt 1 by a mixing device 3. The quantity of AS relative to urea is preferably below the eutectic point and the temperature after mixing is above the solidification temperature of pure urea so that the resulting melt 4 is a pure liquid without a solid phase (clear melt).

The granulation process takes place in a granulator 5. Said granulator 5 in this example has basically a first zone 5A, a second zone 5B and a third zone 5C in this order from an inlet end to an outlet end.

A first portion 6 of said melt 4 is directly fed to the granulator 5, more in detail to the first zone 5A, by suitable means such as sprayers or the like. In this zone, the melt is contacted with solid seeds 12 as will be further explained hereinbelow.

A second portion 7 of the melt 4 is further processed and added with another AS-containing stream 8 in a wet milling section 9. By adding the additional stream 8, the ammonium sulphate exceeds the eutectic point leading to the formation of a slurry 10 containing solid crystals of AS in the liquid phase. The slurry 10 is basically a micronized dispersion of crystals of AS into a liquid containing both urea and AS.

Preferably the crystals of AS in the slurry 10 have a size ranging from 10 to 100 microns, more preferably even smaller for example ranging from 1 to 50 microns. In some embodiments the wet milling section 9 may include multiple wet milling stages in order to reach a required small size of the solids dispersed in the liquid flow.

Said slurry 10 is sprayed in the second zone 5B of the granulator 5, via suitable sprayers 11.

Further inputs of the granulator 5 include solid seeds 12 and fluidization air 13.

The seeds 12 can be, for example, small crystals of AS or small particles of urea and AS. The seeds 12 for example may be crystals of AS taken from the feed 2 or small particles of urea and AS obtained by crushing some of the granules 14 delivered by the granulator 5 or by solidifying a dedicated small portion of the urea melt 4.

The granulator operates as follows. In the first zone 5A, the seeds 12 are contacted with the melt 6 which forms a thin first layer around the seeds. The so obtained granules are contacted with the slurry 10 in the subsequent zone 5B, leading to the progressive formation of larger granules. The zone 5C is a cooling down zone where the structure of the granules is stabilized.

Stream 14 of granules is the end product of the granulator 5. As mentioned above, a portion of said granules 14 may be internally recirculated and crushed to generate the seeds 12, in some embodiments. The crushing of granules may generate some solid matter under the minimum size of the seeds; this solid matter (fines) is used in the mixing device 3 where it is dissolved in the urea 1. Prior to the mixing device 3, the fines can be further reduced in size, e.g. milled, if necessary.

Preferred features and parameters of the process of FIG. 1 are the following.

The urea melt 1 has a temperature around 130-140° C. depending on the concentration; ammonium sulphate in stream 2 corresponds to an amount of 7% to 9% (mass) of the urea, which is below the eutectic point of about 10%. Hence the melt 4 is a pure liquid being the temperature after mixing around 125-135° C. The AS-containing stream 2 is preferably at ambient temperature, for example 25° C. The ammonium sulphate being colder than the urea is an advantage since cooling in the mixing device 3 reduces the temperature sensitive formation of undesired by-products such as biuret.

The temperature of the slurry stream 10 is preferably controlled at around 125-135° C., e.g. by pre-heating the solid 8 in a suitable pre-heater. The slurry sprayers 11 are preferably designed to produce droplets having an average size of 100 to 300 microns, thus being significantly greater than the size of the crystals in the slurry.

Accordingly, in the region 5A the 500-1000 microns seeds are covered with a 200-400 microns layer of urea and ammonium sulphate; then in the region 5B the particles are sprayed with the 100-300 microns droplets of hot slurry until a desired size of granules (typically 2 to 4 mm) is reached. In the region 5C, the granules are cooled to around 70° C. The granules leaving the granulator 5 are further cooled to 40-50° C. before storage.

Figure 2:
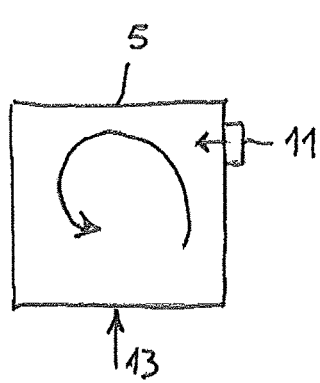
FIGS. 2 and 3 are schematic cross sections of the granulator of FIG. 1.
Figure 3:
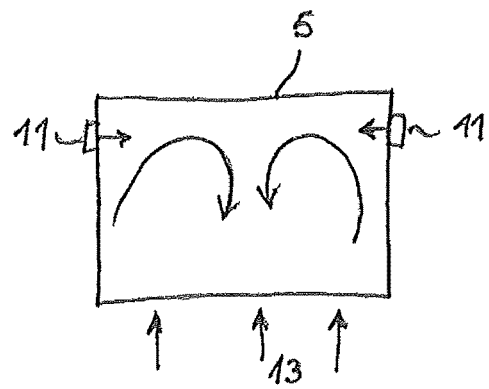

FIGS. 2 and 3 are exemplary cross sections of the granulator 5. In both cases, a whirling motion is established by a suitable arrangement of the sprayers 11. FIG. 2 relates to a single-vortex embodiment and FIG. 3 to a double-vortex embodiment.

The vortex or double-vortex arrangement creates an upper wetting zone, where the granules are contacted with liquid or slurry from the sprayers 11 (which also provides the momentum to maintain the rotational state of the vortex) and a lower zone of solidification of the liquid layer deposited on the granules.

Figure 4:
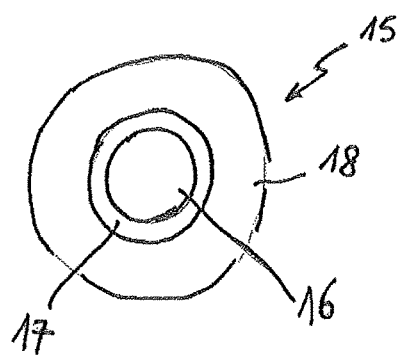
FIG. 4 is a section of a granule obtainable with the process of FIG. 1.
Figure 3:
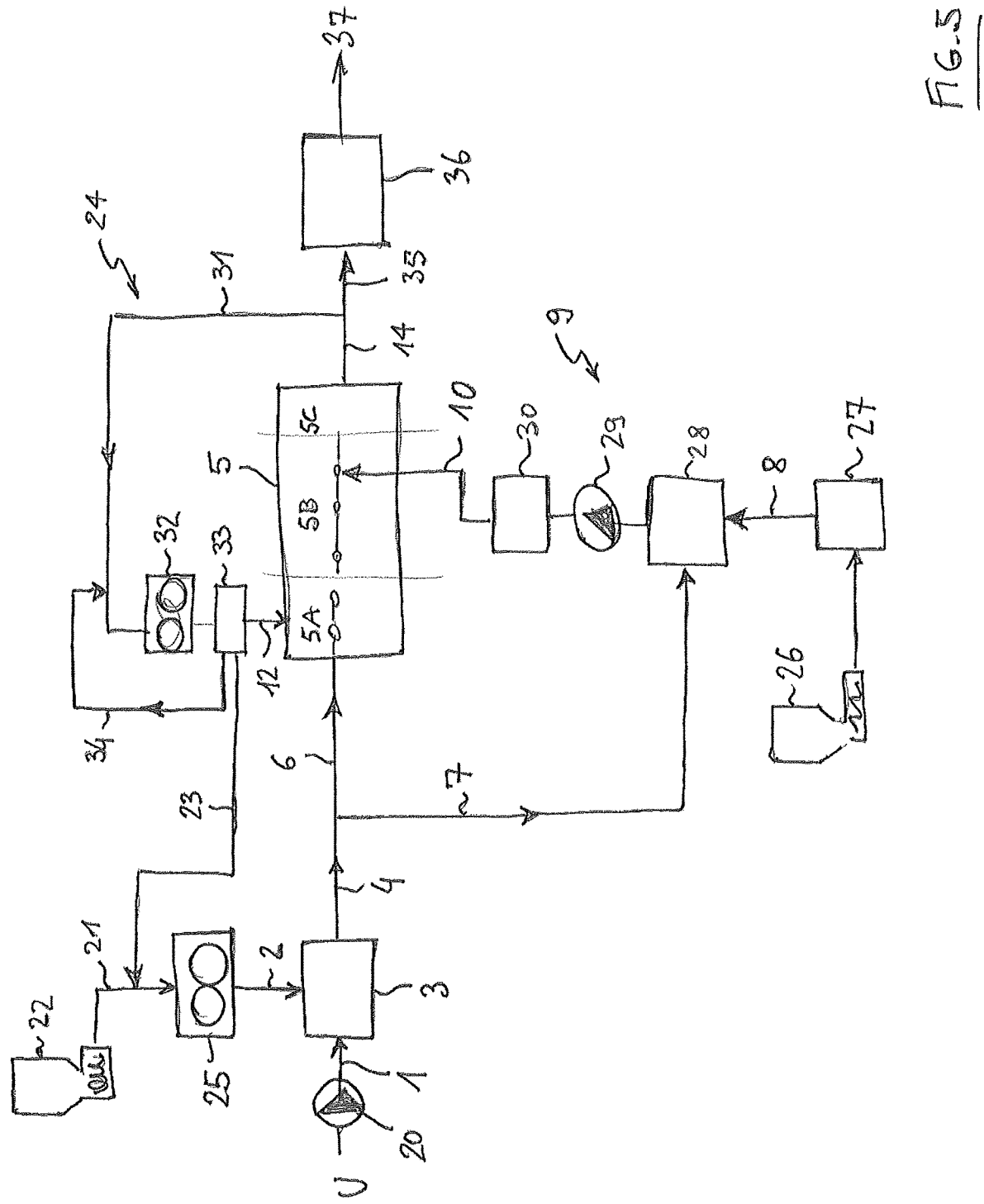

FIG. 4 discloses the structure of granules obtainable with the above process, showing a core 16 (corresponding to seeds 12), an inner layer 17 around the core 16, formed in the region 5A (binder layer) and a layer 18 formed in the region 5B and made of solid slurry. In some embodiments a further outer layer including an additive (e.g. hydrophobic additive) is also obtained.

Further details of a preferred embodiment are disclosed in FIG. 5, where items and flow lines corresponding to FIG. 1 are denoted with the same numerals for simplicity.

The urea melt 1 is pumped through a melt pump 20 to a feeding pressure which is preferably in the range 8 to 15 bar. The ammonium-sulphate containing stream 2 is obtained by feeding ammonium sulphate 21 from a hopper 22, possibly mixed with fines 23 recirculated from a seed generation loop 24. The mixed granular flow, containing solid ammonium sulphate 21 and fines 23, can be milled in a dry milling unit 25, if appropriate, to further reduce the particle size and facilitate dissolution.

The ammonium sulphate 21 may be in a crystalline form or in a coarser form. The term of crystalline form is used to denote a mean particle size of around 1 mm. A crystalline form is generally suitable for direct feeding to the mixer 3, i.e. without further reduction in the dry milling unit 25; when ammonium sulphate 21 is available in a coarser form, e.g. with a mean particle size of 2 mm or more, the further milling in the unit 25 is preferred.

As per thermal balance in the mixer 3, the mixing of urea 1 and AS-containing stream 2 results in a temperature drop. This temperature drop is a positive feature when working with urea since it reduces the formation of biuret.

The mixer 3 is preferably a low-residence and high-shear machine to induce enough turbulence allowing easy dissolution. Preferably, the AS crystals are further pulverized during the mixing operation so that the contact area between the solvent and the solute is increased to the benefit of a complete dissolution.

The clear melt 4 is divided into a main stream 6, directed to the granulator 5, and a side stream 7 for the formation of a slurry. Usually the side stream 7 is greater than the main stream 6, i.e. the side stream 7 is 70% to 95% of the stream 4 delivered by the mixer 3.

The further ammonium sulphate 8 to be mixed with the side stream 7 is provided, in this embodiment, by a second hopper 26. The solid matter form said hopper 26 is preheated in a plate heater 27, for example to a temperature of 60 to 120° C., and then is directed to the wet milling section 9.

Said section 9 comprises a first wet miller 28, a slurry pump 29 and a second wet miller 30.

The pre-heated solid ammonium sulphate is contacted with the side stream 7 of clear melt in the first wet miller 28, which is designed to disperse and mill down the ammonium sulphate in the liquid melt and to generate crystals with a first average size, e.g. 100 to 500 microns. The slurry pump 29 is provided to push the slurry through the second wet miller 30 which is typically designed to disperse further the solid crystal into the liquid melt leading to a second average size which is finer than the first average size, e.g. 10 to 100 micron. In a further embodiment the second wet miller 30 can include a twin unit in series to reach an even smaller average size of the crystals, preferably 1 to 50 micron. The second wet miller 30 produces the slurry 10 which is fed to the zone 5B of granulator 5.

The seeds 12 are produced by the loop 24 using granules 31 taken from the output 14 of the granulator 5. Said granules 31 are crushed in a crusher 32 and crushed granules pass through a sieve 33 to select particles within a desired size range (e.g. 500 to 1000 microns) which form the seed stream 12. Particles outside this range are sent to lines 34 and 23. Larger particles (e.g. >1000 microns) are sent back to the crusher via line 34; smaller particles (e.g. <500 microns), also termed fines, are sent via line 23 to the feed of the milling unit 25 (if provided) or to the urea/AS mixer 3.

Only a small portion of granules is internally used for the generation of seeds; the rest of granule output 14 (line 35) is for example cooled down in a suitable cooler 36 to form a granular composite fertilizer 37.

EXAMPLE

Figure 6:
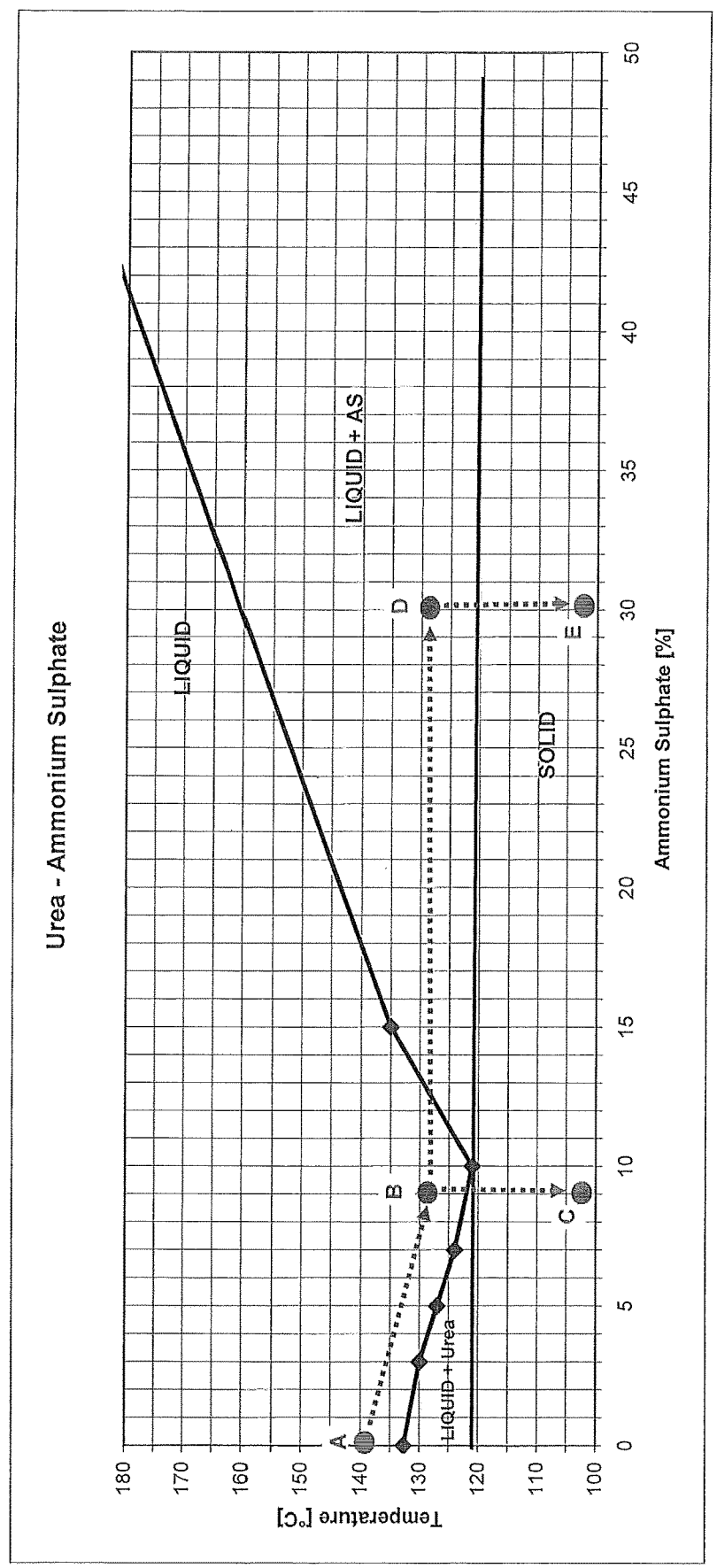
FIG. 6 is an experimental diagram of the UAS melting temperatures.

FIG. 6 provides an example of the transformations taking place in the process of FIG. 5.

Point A of the diagram of FIG. 6 denotes a urea melt 1 having a temperature of around 140° C. Said urea melt 1 is mixed with an ammonium sulphate-containing stream 2 at ambient temperature, providing a clear melt 4.

Point B denotes said clear melt 4, having a temperature of 128° C. and containing 9% of ammonium sulphate.

A stream 6 separated from said clear melt 4 is injected in the first section 5A of the granulator, where it contacts seeds 12 and wherein the temperature is controlled in the range 95 to 105° C., resulting in a solidification process. Said solidification process is evidenced from point B to point C. Point C denotes seeds 12 which are covered by a thin layer of solid having uniform composition.

Said clear melt 4 containing 9% of ammonium sulphate (point B) is further added with ammonium sulphate so as to achieve a concentration of ammonium sulphate of around 30% and obtain a slurry 10, which is identified by point D.

Said slurry 10 is sprayed in the section 5B of the granulator, where it contacts the granules denoted by point C and wherein the temperature is controlled in the range 95 to 105° C., resulting in the progressive formation of larger granules covered by a solid out-layer and identified with point E.

The invention claimed is:

1. A process for making a combined fertilizer comprising:
   i) a first nitrogen-based fertilizer;
   ii) one or more second nitrogen-based fertilizer(s) different from said first nitrogen-based fertilizer, and/or one or more nutrient(s), collectively called one or more further components,
   wherein said combined fertilizer is made by a process of granulation in a fluid bed comprising the steps of:
   providing a first liquid feed to a first region of a granulation environment,
   providing a second liquid feed to a second region of said environment,
   wherein solid seeds acting as starting points for the granulation process are fed to said first region of the granulation environment, and said second region is downstream said first region;
   and wherein in the first region of the granulation environment, the first liquid feed solidifies on the solid seeds forming a binder layer around the solid seeds, and
   the second liquid feed has the form of a micronized slurry of said one or more further components in the first nitrogen-based fertilizer, spraying the second liquid feed over the granules previously formed in the first region;
   wherein the micronized slurry contains solid crystals of said one or more further components, and is sprayed in the form of droplets having an average size at least 5 times the average size of said crystals; and
   wherein the seeds have an average size of 500-1000 microns, the binder layer has a thickness of 200 to 400 microns, and said crystals have a size not greater than 100 microns.

2. The process according to claim 1, wherein said solid seeds and said first and second liquid feed include said first nitrogen-based fertilizer and said one or more further components.

3. The process according to claim 1, further comprising:
   dissolving said one or more further components in a liquid flow of the first nitrogen-based fertilizer, obtaining a liquid melt;
   splitting said liquid melt into a first portion and a second portion;
   using said first portion of liquid melt to provide said first liquid feed of the granulation environment, and
   using said second portion of liquid melt to provide said second liquid feed as a micronized slurry.

4. The process according to claim 3 wherein: said step of dissolution is carried out with a ratio between said one or more further components and the first fertilizer which is below the eutectic point and the temperature is controlled so that no solid phase is present in the obtained liquid melt;
   a further amount of said one or more further components is added to said second portion of liquid melt, in order to form said micronized slurry.

5. The process according to claim 3, wherein said second portion of the liquid melt is larger than the first portion.

6. The process according to claim 5, wherein said first portion is 5% to 30% of the total flow.

7. The process according to claim 5, wherein said second portion is 70% to 95% of the total flow.

8. The process according to claim 1, wherein the solid seeds are generated with any of the following techniques: crushing a portion of the granules delivered by said process of fluid-bed granulation; or drying or pastillation of a liquid.

9. The process according to claim 1, wherein the fluid bed of granulation has a vortex condition, where at least one vortex with a horizontal axis is established in the fluidized bed.

10. The process according to claim 9, wherein the fluid bed has a double-vortex condition including two substantially parallel and counter-rotating vortex with a horizontal axis.

11. The process according to claim 1, wherein:
    at least one of said first and second nitrogen-based fertilizers contain urea or ammonium nitrate;
    said nutrients comprise any of: sulphur, potassium, phosphorous, calcium and composite thereof.

12. The process according to claim 11, wherein said nutrients further comprise one or more microelements.

13. The process according to claim 12, wherein the one or more microelements comprise zinc, copper, manganese, chlorine, and/or molybdenum.

14. The process according to claim 1, wherein a liquid melt obtained by dissolving said one or more further components in a liquid flow of said first nitrogen-based fertilizer has a temperature lower than the temperature of the first liquid nitrogen-based fertilizer, reducing the temperature-sensitive formation of not desired by-products.

15. The process according to claim 1, wherein an additive is added to a liquid or a solid feed or injected inside the granulation environment to form a protective layer of the granule, said protective layer having a thickness of 50 to 300 microns.

16. The process according to claim 15, wherein a hydrophobic additive is added to provide protection from humidity.

17. The process according to claim 15, wherein said protective layer has the thickness of 100 to 200 micron.

18. The process according to claim 15, wherein said additive comprises one or more of: blending of carbonates, sulphate or phosphate salts, metal oxides.

19. The process according to claim 18, wherein said additive is combined with an organic matter comprising a wax formulation, an oil based solution, or a cellulose based suspension.

* * * * *